UNITED STATES PATENT OFFICE.

J. B. HYDE, OF NEWARK, NEW JERSEY.

IMPROVEMENT IN TREATMENT OF PEAT FOR COMPOSTING.

Specification forming part of Letters Patent No. 23,467, dated April 5, 1859.

*To all whom it may concern:*

Be it known that I, J. BURROWS HYDE, of the city of Newark, county of Essex, and State of New Jersey, have discovered a new and useful Manner for Treating Peaty Matters for Agricultural Purposes; and I declare the following to be a full and complete description thereof. (See also my application for patent filed January 25, 1856.)

There are several varieties of peaty matters, some of which are composed for the most part of rooty, fibrous portions, and often of leaves, whereas other kinds are almost or quite composed of fine particles, and form a pasty-like consistency when mixed with water, in which state it is of a dark umber color. The best material for my purpose is that last named, and the poorest the first named, and the intermediate kinds are useful according as they produce the larger quantity of the fine portion referred to.

I excavate the material and dry it by any means I find the most convenient, preferring to dry it on raised platforms provided with means to shelter it, when necessary, from the rain, and after it has parted with most of the moisture I pass it through proper mills to reduce it into small lumps, when it should be again placed on the platforms until it is quite dry. I then grind it into a powder, the finer the better, when it is ready for use; but if the material be not of the best quality above named, and shall contain fibrous, woody, or leafy portions, it should be screened or sifted to thoroughly separate the portion composed of fine particles. This sifting may be done in some cases with advantage before the grinding process. This powder will contain generally a good percentage of ammonia, will absorb ammonia readily from urine, guano, &c., with a great tenacity to retain it. It is almost wholly carbonaceous, thus supplying an essential element to the soil in a minute and desiccated state. It is highly disinfectant, and has a peculiar property to absorb and retain moisture; hence is of a cooling nature and has a tendency to prevent the earth from baking, all of which properties particularly render the material thus prepared useful, economical, and convenient for mixing with pulverized manures—such as guano, pondrith, superphosphate of lime, marls, and particularly with dried and pulverized fish-manure. I mix and thoroughly incorporate the peat as prepared with the pulverized manure in the proportions of equal quantities of each, by weight, or any other proportions that may be beemed best for the particular soil. The more dry or silicious the soil the greater should be the proportion of the peaty preparation, which I propose to name for this purpose "Ulmine Powder." As thus mixed with the manure or fertilizing-dust, it is ready for use without further care; and it will be found in use that a given quantity of this mixture will go as far and produce equally good results as a like quantity of the manure (good as guano) without the ulmine, and in some cases with even better results, saving a great expense thereby.

I am aware that peaty matters have been used to spread upon the soil, or to be plowed into the soil as it is dug from its bed or after it has dried in lumps. It has likewise been mixed with manure-heaps to form fertilizing-compost.

I am also aware that certain kinds of peaty matters which by exposure to air and rain, and particularly to frost, will disintegrate into fine granular particles, and after such exposure have been mixed with richer fertilizing material or compost; but in the necessary time and exposure of the material for such disintegration it is deprived of much of its fertilizing property; besides, such use of peaty material is quite distinct from the mode in which I employ it. By treating it as described, and by mechanical pulverization and using it in a state of fine dry powder, all its fertilizing property is retained and it is presented to the soil in a condition to be readily decomposed and taken up by the vegetation, as well as to readily combine with and improve the action of the powder of richer fertilizers; but

What I claim, and wish to secure by Letters Patent, is—

The use of peaty matter as a basis for admixture with other richer manures when said peaty matter shall have been dried and finely powdered previous to admixture, as set forth.

J. B. HYDE.

Witnesses:
 DAVID A. COGAN,
 ROBERT KNOX.